United States Patent
Christensen et al.

(10) Patent No.: US 12,209,198 B2
(45) Date of Patent: *Jan. 28, 2025

(54) LATEX POLYMER WITH IMPROVED WASHABILITY AND BLOCK RESISTANCE

(71) Applicant: SWIMC LLC, Cleveland, OH (US)

(72) Inventors: Dana Christensen, Crystal Lake, IL (US); Tyler Bell, Crystal Lake, IL (US); Robert Sandoval, Crystal Lake, IL (US); Mary Jane Hibben, Elburn, IL (US); Michael Wildman, Hoffman Estates, IL (US)

(73) Assignee: SWIMC LLC, Cleveland, OH (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/897,939

(22) Filed: Aug. 29, 2022

(65) Prior Publication Data

US 2023/0075015 A1 Mar. 9, 2023

Related U.S. Application Data

(63) Continuation of application No. 16/765,942, filed as application No. PCT/US2018/064784 on Dec. 10, 2018, now Pat. No. 11,459,480.

(60) Provisional application No. 62/596,421, filed on Dec. 8, 2017.

(51) Int. Cl.
| | |
|---|---|
| C09D 133/08 | (2006.01) |
| C08F 2/00 | (2006.01) |
| C08F 20/18 | (2006.01) |
| C08K 3/22 | (2006.01) |

(52) U.S. Cl.
CPC ............. *C09D 133/08* (2013.01); *C08F 2/00* (2013.01); *C08F 20/18* (2013.01); *C08K 2003/2241* (2013.01)

(58) Field of Classification Search
CPC .................................................. C09D 133/26
See application file for complete search history.

(56) References Cited

U.S. PATENT DOCUMENTS

| | | | |
|---|---|---|---|
| 4,529,787 A | 7/1985 | Schmidt | |
| 4,999,218 A | 3/1991 | Rehmer et al. | |
| 5,609,963 A | 3/1997 | Cai et al. | |
| 5,863,998 A | 1/1999 | Cai | |
| 6,488,760 B1 | 12/2002 | Binns et al. | |
| 6,518,334 B1 | 2/2003 | Calhoun et al. | |
| 6,762,230 B2 | 7/2004 | Brandenburger et al. | |
| 6,822,014 B2 * | 11/2004 | Katou | C09G 1/16 524/833 |
| 7,659,340 B2 | 2/2010 | Coward et al. | |
| 7,812,079 B2 | 10/2010 | Brandenburger et al. | |
| 8,106,239 B2 | 1/2012 | Zhou et al. | |
| 8,110,624 B1 | 2/2012 | Brandenburger et al. | |
| 8,754,151 B2 | 6/2014 | Roller et al. | |
| 2009/0149591 A1 | 6/2009 | Yang et al. | |
| 2010/0063201 A1 | 3/2010 | Yamamoto | |
| 2010/0178494 A1 | 7/2010 | Foster et al. | |
| 2011/0244134 A1 | 10/2011 | Dombrowski | |
| 2014/0303318 A1 | 10/2014 | Killilea et al. | |
| 2014/0378600 A1 | 12/2014 | Hibben et al. | |
| 2016/0145460 A1 | 5/2016 | Bell et al. | |
| 2017/0029654 A1 | 2/2017 | Hibben et al. | |
| 2017/0247565 A1 | 8/2017 | Bell et al. | |
| 2017/0283626 A1* | 10/2017 | Booth | C08L 75/04 |

FOREIGN PATENT DOCUMENTS

| | | | |
|---|---|---|---|
| CN | 1433450 A | 7/2003 | |
| CN | 101275005 A | 10/2008 | |
| CN | 103642339 A | 3/2014 | |
| JP | S5339987 A | 4/1978 | |
| JP | S6081263 A | 5/1985 | |
| WO | WO-0136547 A1 * | 5/2001 | C09D 11/30 |
| WO | WO 01/57143 A1 | 8/2001 | |
| WO | WO 2013/090341 A1 | 6/2013 | |

OTHER PUBLICATIONS

BASF's Joncryl® 683 Technical Data Sheet.*
https://products.basf.com/global/en/cp/methoxy-propyl-acetate.html.*
International Standard ISO 3682, "Binders for Paints and Varnishes—Determination of Acid Value—Titrimetric Method," (1996), 6 pages.
International Standard Astm G154, "Standard Practice for Operating Fluorescent Ultraviolet (UV) Lamp Apparatus for Exposure of Nonmetallic Materials," (2016), 11 pages.
International Standard ASTM D2369-90, "Standard Test Method for Volatile Content of Coatings," (1990), 3 pages.
International Standard ASTM D2486-96, "Standard Test Method for Scrub Resistance of Wall Paints," (1996), 3 pages.
International Standard ASTM D3450-00, "Standard Test Method for Washability Properties of Interior Architectural Coatings," (2000), 4 pages.
International Standard ASTM D4946-89, "Standard Test Method for Blocking Resistance of Architectural Paints," (1989), 2 pages.
Koleske et al., "Additives Guide," *Paint and Coatings Industry*, Apr. 2003, pp. 12-86.

(Continued)

*Primary Examiner* — Vu A Nguyen

(74) *Attorney, Agent, or Firm* — Mueting Raasch Group

(57) ABSTRACT

Coating compositions or paint having a pigment blended with a polymer system including one or more latex polymers, wherein the polymer system contains an alkali-soluble resin having an acid value and molecular weight and provided in a preferably desired amount to demonstrate optimal performance characteristics of washability, stain resistance or scrubability without negatively impacting block resistance, especially when neutralized with a low-volatility base.

21 Claims, No Drawings

(56) References Cited

OTHER PUBLICATIONS

Wikipedia, "Acid value", Jul. 2, 2016, retrieved on Feb. 11, 2019 from https://en.wikipedia.org/w/index.php?title=Acid_value&oldid=728014612; entire document, especially p. 1, para. 1.
PCT Search Report and Written Opinion for PCT/US2018/064784 dated Feb. 11, 2019; 8 pgs.

* cited by examiner

LATEX POLYMER WITH IMPROVED WASHABILITY AND BLOCK RESISTANCE

RELATED APPLICATION

The present application is a continuation of U.S. application Ser. No. 16/765,942, filed May 21, 2020, which is the § 371 U.S. National Stage of International Application No. PCT/US2018/064784 filed Dec. 10, 2018, which claims the benefit of U.S. Provisional Application Ser. No. 62/596,421, filed Dec. 8, 2017, which are incorporated herein in their entireties.

TECHNICAL FIELD

The present invention relates to latex paint compositions containing one or more latex polymers.

BACKGROUND

Conventionally, paint compositions containing latex polymer particles include a coalescent in addition to pigments and fillers. The coalescent typically functions as a solvent as well as a plasticizer for the polymer particles to soften the latex polymer particles and assist in the formation of a continuous coating or film after applying the coating to a surface and allowing it to dry.

Desirable coalescent agents are generally stable in the presence of water and compatible with other ingredients typically used in paint formulations, particularly the latex polymers, such that the stability of the latex-based composition is not compromised. Typical coalescent agents contain volatile organic compounds (VOC) and are sufficiently volatile to escape when the applied coating composition is allowed to dry, but sufficiently nonvolatile to evaporate more slowly than other ingredients (e.g., drying retarders, antifreezes) that delay film formation.

For environmental and regulatory reasons, it has become imperative to develop latex polymers that can be used in paint and coating compositions for painting architectural surfaces, especially interior surfaces, without the use of VOCs or with lower VOC content. Coalescent agents of the type described in U.S. Pat. Nos. 6,762,230 and 7,812,079, for example, are low-VOC compounds that meet stringent environmental requirements, while facilitating film formation.

To make paint formulations of a desired color and finish, base paint compositions are combined at a point-of-sale outlet with low-VOC colorant compositions of the type described in U.S. Pat. No. 7,659,340, for example. However, typical latex paint compositions having low VOC content may form soft, tacky coatings that show poor performance characteristics, for example such as poor block resistance, poor stain resistance or poor washability. This situation is further complicated in deeply colored paint formulations that require high loading of the low VOC or zero-VOC colorants, which generally have residual non-volatile soft components, making hard film formation even more difficult. Therefore, use of such paints is generally limited to ceilings or low traffic areas of a building or home.

In some instances, paint formulations are neutralized with low-volatility bases that improve washability. Low-volatility bases, however, may negatively impact block resistance.

From the foregoing, it will be appreciated that there is a need for latex compositions for use in paint formulations having various finishes, such as flat, high or medium gloss, including deeply colored formulations that form hard films in the presence of low VOC or zero-VOC components, even in the absence of coalescent agents, and demonstrate excellent performance characteristics, including stain resistance and washability of the coating while maintaining block resistance and scrub resistance, including such formulations neutralized with one or more low-volatility bases.

SUMMARY

The present invention provides coating compositions that include at least one latex polymer and an alkali-soluble resin for use in paint.

Accordingly, in some aspects, the present invention provides paint or coating compositions that include a polymer system, a coalescent, and at least one pigment, the polymer system comprising one or more latex polymers and an alkali-soluble resin, wherein at least about 2.5 wt. % up to about 15 wt. % of the total polymer resin solids present in the coating composition comprise the alkali-soluble resin, the alkali-soluble resin preferably having a weight average molecular weight (Mw) of about 1,500 to about 20,000 and an acid number of at least about 100 up to about 250 units (mg KOH/g resin). In some aspects, the coalescent is a low VOC coalescent. In some aspects, the alkali-soluble resin is neutralized with a low-volatility base.

In some other aspects, the present invention provides a method of making a paint or coating composition by providing a base latex polymer having one or more latex polymers and blending at least one alkali-soluble resin with the base latex polymer to provide a polymer system. In some aspects, it is contemplated that the base latex polymer can be formed as a dispersion (e.g., emulsion polymerized) in the presence of the alkali-soluble resin. The paint or coating composition may also include one or more pigments blended with the base latex polymer, alkali-soluble resin, the blend of the base latex polymer and alkali-soluble resin, or the dispersion of the base latex polymer and alkali-soluble resin. When the alkali-soluble resin is blended with the base latex polymer, or the base latex polymer dispersed in the alkali-soluble resin, the polymer system preferably comprises about 2.5 wt. % to about 15 wt. % of the alkali-soluble resin based on the total polymer resin solids present in the coating composition, the alkali-soluble resin preferably having a weight average molecular weight (Mw) of about 1,500 to about 20,000 and acid number of at least about 100 up to about 250. In some aspects, the at least one alkali-soluble resin is dissolved in a basic aqueous solution before being blended with the base latex polymer. In some aspects, the acid content of the polymer system is neutralized with a low-volatility base. In some aspects, the base latex polymer is formed in the presence of the at least one alkali-soluble resin dissolved in a basic aqueous solution to form the dispersion. In some aspects, the base latex polymer comprises a multistage latex polymer having at least a first stage and a second stage.

In some aspects, the coating composition when used in paint (e.g., architectural paint), such as a flat, semi-glossy or glossy finish paint for example, has an improved stain resistance and washability while maintaining block resistance, scrub resistance, or both. In some aspects, such a coating composition used in a finish paint has a washability rating of at least 7, a scrub resistance of at least about 750 scrubs, and a block resistance of at least 6. In some other aspects, the coating composition when used in a paint has a washability rating of at least 8, a scrub resistance of at least about 1000 scrubs, and a block resistance of at least 7.

Accordingly, in some aspects, the present invention provides base paints having a polymer system that includes a base latex polymer and preferably at least about 2.5 wt. % to about 15 wt. % of the alkali-soluble resin based on the total polymer resin solids present in the coating composition, the alkali-soluble resin having a weight average molecular weight (Mw) of about 1,500 to about 20,000 and acid number of at least about 100 up to about 250 units (mg KOH/g resin). In some other aspects, the present invention provides a method of making a base paint formulation, wherein the base paint formulation has a polymer system that includes a base latex polymer and preferably at least about 2.5 wt. % to about 15 wt. % of the alkali-soluble resin based on the total polymer resin solids present in the coating composition, the alkali-soluble resin having a weight average molecular weight (Mw) of about 1,500 to about 20,000 and acid number of at least about 100 up to about 250 units (mg KOH/g resin). In some other aspects, the present invention provides a method of making a paint formulation of a desired color by adding a colorant composition to the base paint formulation at a point-of-sale.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

SELECTED DEFINITIONS

Unless the context indicates otherwise the following terms shall have the following meaning and shall be applicable to the singular and plural:

The terms "a," "an," "the," "at least one," and "one or more" are used interchangeably. Thus, for example, a system or method that includes "a" polymer means that the system or method may include "one or more" polymers.

The term "acid number" refers to the mass of potassium hydroxide (KOH) in milligrams that is required to neutralize one gram of a component or mixture of components, such that it can be used to quantify the acidity of the component, for example an alkali-soluble resin, or mixture of components. By neutralizing the acidity of the component or components, the acid number is a measure of the number of carboxylic acid groups in a component or mixture of components. As such "units" referring to acid number is mg KOH/g resin. Acid number may be determined using the BS EN ISO 3682-1998 standard.

The term "acid percent" refers to the weight percent acid in the component. For converting between acid number and acid percent, the following equation can be used:

$$\text{Acid Value} = wt\% \text{ acid} * \frac{1}{MW_{acid}} * 561$$

For example: For a material that is 30 wt. % of methacrylic acid (Molar Weight=86.1 g/mol), the acid value can be calculated as follows: Acid value=30/86.1*561=195. Similarly, for a material whose acid value and acid are known, the acid percent can be calculated using the molar weight of the particular acid.

The term "architectural paint" refer to a paint for use on the interior or exterior of a building or construction surfaces, e.g., walls, trim, floors, decks, railings, ceilings, roofs (including metal roofing, shingles and tiles), roadways, sidewalks, etc.

The term "base paint" means a water-borne paint product packaged in a largely but incompletely filled point-of-sale container with a volume of about 0.2 to 20 L equipped with an openable and recloseable lid, cap or other closure, and which may be used as is but normally will be tinted at the point-of-sale outlet by adding one or more colorants to the paint product in its container, and stirring, shaking or otherwise mixing the container contents to disperse the colorant throughout the base paint product. The base paints described herein are "in-store tintable," referring to base paints that are present in containers (such as paint cans, for example) and can be tinted or colored by adding a colorant composition in the store, viz. at a point of sale outlet, to provide a paint formulation of a desired color and finish.

As used herein, the term "block resistance" refers to the ability of a coating film or paint film, when applied to two surfaces, not to stick to itself on prolonged contact when pressure is applied for a defined period of time. Block resistance is a measure of the degree of hardness or degree of cure of a film of a coating composition or paint formulation. ASTM D4946-89 (Standard Test Method for Blocking Resistance of Architectural Paints) may be used to measure block resistance.

The term "colorant" refers to a composition that can be added to (e.g., dispensed into) a point-of sale container whose interior volume is largely (e.g., two thirds of the container volume or more) but not completely already filled with a base paint so as to alter the hue or lightness of such base paint, and which contains pigment or dye and an optional vehicle but is substantially free of binder.

The term "component" refers to any ingredient or portion thereof that includes a particular feature or structure. Examples of components include compounds, monomers, oligomers, polymers, and organic groups contained therein.

The term "comprises" and variations thereof do not have a limiting meaning where these terms appear in the description and claims. Thus, a composition comprising an ethylenically unsaturated compound means that the composition includes one or more ethylenically unsaturated compounds.

As used herein, the term "container" refers to any vessel (either with or without a lid or other type of closure) used to store, mix, tint or color a paint formulation, and includes the vessels in which paints are typically marketed and sold. Suitable containers include paint cans, paint bottles, containers made of metal, containers made of plastic or other polymeric materials, and the like.

The term "dispersion," as used herein, in the context of a dispersible polymer refers to the mixture of a dispersible polymer and a carrier. Unless otherwise indicated, the term "dispersion" is intended to include the term "solution."

The term "double bond" is non-limiting and refers to any type of double bond between any suitable atoms (e.g., C, O, N, etc.). The term "ethylenically unsaturated" refers to a carbon-carbon double or triple bond capable of participating in a free-radical initiated polymerization reaction, and is not intended to encompass the carbon-carbon double bonds present in awl groups such as, for example, the phenyl group of styrene. Thus, for example, dodecyl benzene sulfonic acid is not considered to include an ethylenically unsaturated group.

The term "finish," as used herein, refers to the texture or appearance of a paint when applied and dried on to a substrate, typically an architectural surface such as an interior wall, for example. The term may also be used to refer to the paint used to produce such texture or appearance when applied to an architectural surface. Paints are typically found in a variety of finishes such as, for example, flat or matte, eggshell, satin, semigloss and glossy finishes. The finish of a particular paint is a function, among other things, of the pigment-to-binder (P-to-B) ratio of the paint or composition, wherein the higher the P-to-B ratio, typically the less reflective the paint. For example, a flat paint typically has a high P-to-B ratio and dries to a non-reflective or minimally reflective appearance when applied to an architectural surface, whereas a glossy finish typically has a lower P-to-B ratio and dries to a reflective appearance when applied to an architectural surface.

As used herein, the term "glass transition temperature" or "Tg" refers to the temperature at which an amorphous, solid material undergoes a reversible transition to a molten, rubber-like state. Unless otherwise indicated, the Tg values described herein are theoretical values predicted using the Fox equation. Application of the Fox equation to estimate the Tg of polymers is well known in the art.

The term "headspace," as used herein, refers to the volume remaining in a container after the container has been filled with a base paint.

The term "multistage," as used herein with respect to a latex polymer, refers to the latex polymer being made using discrete, sequential charges of two or more monomers or monomer mixtures, or using a continuously-varied charge of two or more monomers. Usually a multistage latex will not exhibit a single Tg inflection point as measured by differential scanning calorimetry (DSC). For example, a DSC curve for a multistage latex made using discrete charges of two or more monomers may exhibit two or more Tg inflection points. Also, a DSC curve for a multistage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The term "on", when used in the context of a coating applied on a surface or substrate, includes coatings applied directly or indirectly to the surface or substrate. Thus for example, a coating applied to a primer layer overlying a substrate constitutes a coating applied on the substrate.

The term "paint" refers to a coating composition including pigment and film-forming binder which when applied to form a thin (e.g., approximately 100 µm) wet thickness coating film on a freshly-sanded smooth wood surface will, when dried, hide or substantially hide the wood grain and will present a new surface with its own appearance.

The term "pigment" includes both organic and inorganic colored, dispersible solid particulate materials and colored dispersible or soluble dye materials, wherein the material imparts visually noticeable color to a base paint when 5 wt. % (in the case of a colored, dispersible solid particulate) or 0.05 wt. % (in the case of a colored, dispersible or soluble dye) of the material is added to (e.g., dispensed into) the base paint. The presence or absence of visually noticeable color may be assessed by preparing drawdown samples of the base paint with and without the pigment, casting such samples as 25 µm dry thickness coated films over the white part of a BYK-Gardner No. PA-2811 opacity drawdown chart (from BYK-Gardner USA) or comparable chart, and examining the coated films under normal overhead interior illumination.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "polymer" includes both homopolymers and copolymers (viz., polymers of two or more different monomers) having two or more repeating units and a weight average molecular weight (Mw) of at least 500 as measured using gel permeation chromatography and a polystyrene standard.

The terms "pigment volume concentration" or "PVC" when used with respect to a paint or other coating compositions mean the total percentage of dried solids volume, including extender pigments and opaque polymers, occupied by a recited pigment species (or if no pigment species is recited, then by all pigment species) in such dried solids.

The term "scrub resistance," as used herein, refers to the ability of the surface of a coating film or paint film to resist being worn away or to maintain its original appearance when rubbed with or against an abrasive surface, typically during cleaning. ASTM D2486-96 (Standard Test Method for Scrub Resistance of Wall Paints) may be used to measure scrub resistance.

The term "substantially free," when applied to components of a composition and not to VOC levels, refers to compositions of the present invention containing no more than about 5 wt. % of a particular component, based on total weight of solids in the composition. For example, a composition of the present invention that is substantially free of coalescent contains no more than about 5 wt. % coalescent. A composition of the present invention that is essentially free of a coalescent component, for example, contains no more than about 0.5 wt. % of the coalescent compound. When applied to VOC levels, the term "substantially free," refers to compositions of the present invention that contain less than about 50 g/L VOCs. Unless otherwise indicated, the terms "low VOC" and "substantially free of VOC" are used interchangeably herein. The term "essentially free of VOC" refers to compositions of the present invention that contain less than 5 g/L of VOCs. The terms, "zero VOC" and "essentially free of VOC" are used interchangeably herein.

The term "volatile organic compound" ("VOC"), as defined by the Environmental Protection Agency (EPA) in 40 C.F.R. 51.100(s), refers to any compound of carbon, excluding carbon monoxide, carbon dioxide, carbonic acid, metallic carbides or carbonates, and ammonium carbonate, which participates in 20 atmospheric photochemical reactions. Typically, volatile organic compounds have a vapor pressure equal to or greater than 0.1 mm Hg. As used herein, "volatile organic compound content" ("VOC content") is as measured by ASTM method D2369-90, refers to the weight of VOC per volume of the coating solids, and is reported, for example, as grams VOC per liter (g/L).

As used herein, the term "washability" refers to the relative ease of removing dirt, soil, discolorations, and the like, from the a dried film of a coating applied to a substrate surface, typically an interior architectural surface such as a wall, for example. The soil or dirt is typically removed by washing with abrasive or non-abrasive cleaning compositions. ASTM D3450-00 (Standard Test Method for Washability Properties of Interior Architectural Coatings) may be used to measure washability. The terms "washability" and "stain resistance" are used interchangeably herein. Washability may be assigned a washability rating on a scale from 0 to 10, where a rating of 0 corresponds to very poor stain removal, and a rating of 10 corresponds to complete stain removal.

The term "water-dispersible" in the context of a polymer refers to a polymer that can be mixed into water (or an aqueous carrier) to form a stable mixture. For example, a mixture that readily separates into immiscible layers is not a stable mixture. Unless otherwise indicated, the term "water-dispersible" is intended to include the term "water-soluble." In other words, by definition, a water-soluble polymer is also considered to be a water-dispersible polymer.

Unless otherwise indicated, a reference to a "(meth) acrylate" compound (where "meth" is in parentheses or bracketed) is meant to include both acrylate and methacrylate compounds.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a of a series of endpoints includes disclosure of not only that range but also all subranges subsumed using such endpoints and also within that range (e.g., 1 to 5 includes 1 to 4, 2 to 3.80, 1.5 to 5, etc.).

DETAILED DESCRIPTION

Certain aspects of the invention described herein feature coating compositions that include a polymer system, used as the binder component or as a blending ingredient in a paint formulation, for example, with at least 2.5 wt. % to about 15 wt. % of the total polymer resin solids present in the polymer system comprising an alkali-soluble resin having a weight average molecular weight between about 1,500 to about 20,000 and an acid number of at least 100 up to about 250. Such a coating composition, when used in a finish paint, preferably has a washability rating of at least 7 and a scrub resistance of at least about 600 scrubs. As The term "polymer" includes both homopolymers and copolymers (viz., polymers of two or more different monomers) having two or more repeating units and a weight average molecular weight (Mw) of at least 500 as measured using gel permeation chromatography and a polystyrene standard.

The composition as described herein is preferably substantially free of volatile organic compounds (VOCs), and is used to make paints, including flat, semi-glossy or glossy finish paints, for example, an architectural paint. These formulations include deeply colored formulations, made by adding colorant compositions to base paint formulations at a point-of-sale. Surprisingly, and in contravention of industry bias, paints that include the polymer compositions described herein are capable of being washed or cleaned without significant film or paint loss and have improved block and scrub resistance, while using the polymer compositions at lower concentrations. Preferred paints demonstrate excellent performance characteristics, such as superior stain resistance, washability or block resistance.

In certain aspects, the coating compositions described herein are suitable for use in low-VOC or zero-VOC paint to be used as an architectural coating or wall paint, including interior architectural coating or wall paints, especially a paint with a flat, matte, eggshell, satin, semi-gloss or high gloss finish.

In certain aspects, the coating composition or paint described herein preferably includes a polymer system made by controlling the molecular weight and acid content of one or more polymers or resins. The latex polymers included in the polymer system may be homopolymers, or copolymers using one-component, two-component or multi-component blends. The polymers accordingly may be single stage or multistage polymers.

Preferably, the one or more latex polymers include one or more, typically two or more, ethylenically unsaturated monomers, such as, for example, (meth)acrylates (e.g. alkyl and alkoxy (meth)acrylates), cycloaliphatic (meth)acrylates (e.g. cyclohexyl (meth)acrylate), aryl (meth)acrylates (e.g., benzyl (meth)acrylate), vinyl esters of saturated carboxylic acids, monoolefins, conjugated dienes, polyfunctional acrylates, and the like, styrene, methyl methacrylate, alkyl(meth) acrylates, vinyl acetate, acrylonitrile, vinyl chloride, other suitable vinyl monomers and the like. Other monomers are also contemplated, including acid-functional and anhydride-functional monomers, such as acrylic acid and methacrylic acid. Exemplary acid-functional and anhydride-functional monomers are disclosed in U.S. Pat. Nos. 5,609,963 B2 and 5,863,998 B2.

In certain aspects, the coating composition or paint formulation comprises a multistage latex polymer, which is made using discrete, sequential charges of two or more monomers or monomer mixtures, or was made using a continuously-varied charge of two or more monomers. The two stages typically are different in composition. Exemplary methods for making a multistage latex are disclosed in International Application No. PCT/US2012/069108, U.S. Patent Publication No. 2016/0145460 A1, and U.S. application Ser. No. 15/594,953, the disclosures of the methods of making multistage latex compositions and multistage latex compositions in the foregoing being incorporated by reference in their entirety herein.

Various methods can be used to prepare the multistage latex described herein, including for example, sequential monomer feed and continuously varying monomer feed techniques. In a sequential monomer feed process, a first monomer or monomer mixture is fed during the early stages of polymerization, and a second monomer (e.g. a different monomer, or a mixture of monomers present in different ratios than in the first monomer mixture) is fed during later stages of polymerization. In a varying monomer feed process, a first monomer composition is fed, followed by the addition of a second monomer at certain points in the polymerization process, and at different speeds. By controlling the type of monomers selected for the feed process, a multistage latex suitable for low VOC, coating compositions or paints may be formed, and the latex preferably provides excellent performance characteristics, such as, for example, block resistance, scrub resistance, tack resistance, and the like, for such coating or paint formulations.

In certain aspects, the multistage latex composition described herein is made by a sequential monomer feed process. In an aspect, polymerization begins with a high Tg monomer feed followed by a low Tg monomer feed, and vice-versa. In a preferred aspect, polymerization begins with a high Tg monomer feed, followed by a low Tg monomer feed.

In certain aspects, the multistage latex composition described herein is made using varying monomer feeds. The resulting polymer will typically have a DSC curve that exhibits no Tg inflection points, and could be said to have an essentially infinite number of Tg stages. The resultant multistage latex will have a gradient Tg from high to low, or vice-versa, depending on the order that monomers of high Tg are fed into the reaction.

In a preferred aspect, the multistage latex described herein is made by a sequential monomer feed process using at least two distinct feeds of monomers. In an aspect, a high Tg stage (viz. a hard stage) is fed first into a reactor vessel, and a low Tg stage (e.g. a soft stage) is added at a later stage in the process. A multistage latex may be formed, and after coalescence, the composition will typically display two distinct Tg values, or at least one Tg corresponding to the monomer stage present at higher concentration. Without being bound to theory, it is expected that no distinct Tg will be observed or detected by DSC for a monomer or monomer mixture in a particular stage that is present in very small quantities relative to the other monomer or monomer mixture.

In an aspect, the multistage latex optionally includes a seed phase, e.g. a relatively small monomer or polymer particle, but the seed is not required, nor essential for preparation or optimal performance of the multistage latex when used in a coating composition or paint formulation.

In an aspect, the relative positions of the first and second phases may be internal and external respectively, or vice-versa. In another aspect, the first and second phases may be neighboring or adjacent. Without being bound by theory, it is believed that the relative position of the stages of the multistage latex is influenced by the method used to make the latex. By controlling the monomers used in each stage of the sequential monomer feed process, the multistage latex described herein may for example contain up to about 50 wt %, about 10 wt % to 50 wt %, preferably about 20 to 40 wt %, more preferably about 25 to 35 wt % of monomers of the first stage, e.g. high Tg or hard stage monomers, and about 50 wt % to 90 wt %, preferably about 60 to 85 wt %, more preferably about 65 to 80 wt % of monomers of the second stage, e.g. low Tg or soft stage monomers, based on the total weight of the composition.

In certain aspects, by controlling the monomers used for each stage of the sequential monomer feed process, a multistage latex composition with optimal minimum film forming temperature (MFFT) is obtained. The MFFT is the minimum temperature at which the latex composition will form a continuous film, viz. the temperature below which coalescence does not occur. The MFFT of the multistage latex composition as described herein is preferably less than about 25° C., more preferably less than about 20° C. A base paint or other paint that includes the multistage latex described herein preferably has an MFFT of less than about 20° C., more preferably less than about 10° C.

In certain aspects, the multistage latex described herein preferably includes at least two polymer portions (e.g., at least two different emulsion polymerized polymer stages) with different Tg values. In a preferred embodiment, the multistage latex includes at least a first stage and a second stage. The first stage preferably has a Tg of about 0° C. to 120° C., more preferably about 50° C. to about 80° C. The second stage preferably has a Tg of greater than about −35° C. to 10° C. In an embodiment, where the multistage latex is intended for use in a pigmented high gloss or semi-gloss paint, the first stage preferably has Tg of about 0° to 120° C., more preferably 25° to 75° C., most preferably 45° to 55° C.

In certain aspects, the multistage latex described herein preferably includes at least two polymer portions, e.g. a first stage and a second stage, with different Tg values, where the difference in Tg (ΔTg) is about 35° C., preferably about 60° C., more preferably about 65° C. In an embodiment, where the multistage latex is intended for use in a pigmented high gloss or semi-gloss paint, the difference in Tg (ΔTg) is preferably about 35° C., preferably about 60° C., more preferably about 65° C.

In certain aspects, the invention described herein includes a multistage latex polymer having at least a first stage and a second stage. In an aspect, the first stage and second stage of the multistage latex separately and preferably include one or more, typically two or more, ethylenically unsaturated monomers. In another aspect, the first and second stage of the multistage latex separately and preferably include one or more, more preferably two or more, polymerization products of ethylenically unsaturated monomers, such as, for example, (meth)acrylates (e.g. alkyl and alkoxy (meth) acrylates), cycloaliphatic (meth)acrylates (e.g. cyclohexyl (meth)acrylate), aryl (meth)acrylates (e.g., benzyl (meth) acrylate), vinyl esters of saturated carboxylic acids, monoolefins, conjugated dienes, polyfunctional acrylates, and the like, styrene, methyl methacrylate, alkyl(meth)acrylates, vinyl acetate, acrylonitrile, vinyl chloride, other suitable vinyl monomers and the like. In an embodiment, the first stage or second stage of the multistage latex optionally includes one or more polyfunctional (meth)acrylate monomers (e.g., one or more multi-ethylenically unsaturated (meth)acrylates). In an embodiment, the first stage and second stage separately and preferably also include one or more ethylenically unsaturated carboxy-functional amide monomers, e.g., ureido-functional monomers, such as monomers formed as the product of the reaction between aminoalkyl alkylene urea (e.g., amino ethylene urea, for example) with an ethylenically unsaturated carboxylic acid or anhydride (e.g., maleic anhydride, for example).

Exemplary ethylenically unsaturated monomers for use in making the latex polymer include, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth)acrylamide, styrene, a-methyl styrene, vinyl toluene, vinyl acetate, vinyl propionate, allyl methacrylate, and mixtures thereof. Preferred monomers include styrene, methyl methacrylate, methacrylic acid, acetoacetoxy ethyl methacrylate, butyl acrylate, and the like.

Exemplary polyfunctional acrylates include, for example, di-, tri- and tetra-functional acrylates such as dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional acrylate monomers include pentaerythritol tetraacrylate, dipentaerytrhitol tetraacrylate, and the like.

Exemplary ureido-functional monomers include, for example, monomers with NR—(C=O)—NH— functionality, where R may be H, substituted or unsubstituted $C_1$-$C_{10}$ alkyl, substituted or unsubstituted $C_3$-$C_6$ cycloalkyl or heteroalkyl, and the like. Without being bound by theory, ureido-functional monomers are believed to promote the wet adhesion of a paint formulation to a substrate, where the formulation includes the multistage latex described herein.

In an embodiment, the first or second stage of the multistage latex each separately and preferably include about 90 to 99 wt %, more preferably about 94 to 96 wt %, and most preferably about 97 to 98 wt % of one or more ethylenically unsaturated monomers, including preferably up to about 5 wt %, more preferably about 1 to 4 wt %, and most preferably about 2 to 3 wt % of one or more ureido-functional monomers, based on the total weight of the monomers in the first or second stage respectively. For example, in a preferred embodiment, the first stage includes methyl methacrylate, butyl acrylate, methacrylic acid, DAAM, and a ureido-functional monomer. In a preferred embodiment, the second stage includes methyl methacrylate, butyl acrylate, DAAM, methacrylic acid, and a ureido-functional monomer.

In a preferred embodiment, the first stage includes about 65-75 wt % methyl methacrylate, about 18-28% butyl acrylate, about 0.5-3 wt % methacrylic acid, about 2-4 wt % DAAM, and about 0.5-3 wt % ureido-functional monomer. In a preferred embodiment, the second stage includes about 25-35 wt % methyl methacrylate, 55-65 wt % butyl acrylate, about 2-4 wt % DAAM, about 0.5-3 wt % methacrylic acid, and about 0.5-3 wt % ureido-functional monomer. In certain aspects, the multistage latex described herein includes, optionally and preferably, a fluorosurfactant. As used herein, the term "fluorosurfactant" refers to synthetic organofluorine compounds with multiple fluorine atoms. Such compounds can be polyfluorinated, perfluorinated (e.g. fluorocarbons), or partially fluorinated, and typically include a hydrophilic head and a fluorinated/hydrophobic tail. Suitable fluorosurfactants may be anionic or nonionic. Commonly used fluorosurfactants include, for example, fluoroalkanes, perfluoroalkanes, their derivatives, and the like. In an aspect, short chain fluorinated compounds are preferred, such as, for example, C1-C10 fluorinated compounds. In a preferred aspect, the fluorosurfactant is an anionic C6-fluorocarbon compound, and is preferably substantially free of PFOS and PFOA, and more preferably, essentially free of PFOS and PFOA. In a preferred aspect, the multistage latex preferably includes up to about 0.5 wt %, more preferably about 0.1 to 0.3 wt % fluorosurfactant, based on the total weight of the multistage latex composition.

In certain aspects, the amount of latex (latex solids and water from the latex) in the coating compositions or paint formulation is about 40 to about 60 wt %. In certain aspects, the total resin solids in the coating composition or paint formulation is about 20 to about 30 wt %. In certain aspects, the coating composition or paint formulation has a viscosity in the range from about 80 to about 120 KU (Krebs Unit).

The alkali-soluble resin represents an ingredient distinct from the one or more latex polymers, and may, for example, be provided as having a weight average molecular weight ("Mw") of about 1,500 to about 20,000 and an acid number greater than about 100 and up to about 250 mg KOH/g resin. Alkali-soluble resins may be prepared by making the polymer using acrylic or methacrylic acid monomers or other polymerizable acid-functional monomers and solubilizing the alkali-soluble resin by addition of a solution of ammonia or other base. In certain aspects, the alkali-soluble resin may be an organic solution polymerized acrylic such as, e.g., an acid0functional organic solution polymerized acrylic. In certain aspects, the alkali-soluble resin may include acrylic acid or methacrylic acid copolymers, such as an ethylene-acrylic acid copolymer. It is also contemplated that other acrylic acid copolymers may be used, including polyester-acrylic acid, polyether-acrylic acid or polyurethane-acrylic acid copolymers, and the like. In certain aspects, the alkali-soluble resin is provided in solid form and dissolved by addition of water and ammonia or other base, which may be blended with the base latex polymer system. In certain other aspects, the base latex polymer may be as a dispersion formed in the presence of the alkali-soluble resin. Examples of suitable alkali-soluble resins include INDUREZ™ SR 10 PG, JONCRYL™ 50, JONCRYL™ 60, JONCRYL™ 63, JONCRYL™ DFC 3025, JONCRYL™ HPD 71, JONCRYL™ HPD 96 MEA, JONCRYL™ HPD 296, PRIMACOR™ 5980 i, and the like.

In some aspects, the coating system contains less than 15 wt. % of the alkali-soluble resin based upon the total resin solid content within the coating composition, while in some other aspects the coating system contains at least about 2.5 wt. % up to about 10 wt. %, in some aspects at least about 2.5 wt. % up to about 7 wt. %, in some aspects at least about 3.0 wt. % up to about 7.5% wt., and in some other aspects at least about 4.5 wt. % up to about 6.5 wt. % of the alkali-soluble resin.

In some aspects, the alkali-soluble resin has an acid number greater than about 100, greater than about 125, greater than about 150, greater than about 175, or greater than about 200. In some aspects, the alkali-soluble resin has an acid number up to about 250, up to about 225, up to about 200, or up to about 175. In some aspects, the alkali-soluble resin has an acid number between about 100 to about 250, between about 125 to about 240, or between about 140 to about 240. For example, INDUREZ™ SR 10 PG has an acid number of about 215-230 mg KOH/g, while JONCRYL™ 50 has an acid number of about 238 mg KOH/g, and JONCRYL™ HPD 296 has an acid number of about 141 mg KOH/g.

In some aspects, the alkali-soluble resin has an acid percent greater than 10, greater than 15, greater than 20, or greater than 25. In some aspects, the alkali-soluble resin has an acid percent up to about 40, up to about 35, or up to about 30. In some aspects, the alkali-soluble resin has an acid percent between about 20 and about 40, between about 25 and about 35, or between about 28 and about 32.

In some aspects, the alkali-soluble resin has an Mw of at least about 1,500, at least about 1,700, at least about 2,000, at least about 3,000, at least about 4,000, at least about 5,000, at least about 6,000, at least about 7,000, at least about 8,000, at least about 9,000, at least about 10,000, at least about 11,000, at least about 12,000, or at least about 13,000. In some aspects, the alkali-soluble resin has an Mw up to about 20,000, up to about 17,500, up to about 16,000, up to about 15,000, up to about 14,000, up to about 13,000, up to about 12,000, up to about 11,000, up to about 10,000, up to about 9,000, up to about 8,000, or up to about 7,000. In some aspects, the alkali-soluble resin has an Mw between about 1,500 and about 20,000, between about 1,700 and about 17,500, between about 5,000 and about 15,000, or between about 5,500 and about 13,000.

In certain aspects, the coating composition or paints made with the polymer system described herein are neutralized with one or more low-volatility bases. In some aspects, the low-volatility base comprises an alkali metal hydroxide, such as potassium hydroxide or sodium hydroxide. In some other aspects, the low-volatility base comprises a neutralizing amine. Suitable examples of neutralizing amines include, without limitation, ammonia, 2-amino-2-methyl-1-propanol (AMP), diethyl amine (DEA), dimethylethanolamine (DMEA), triethylamine (TEA), monoethanol amine, diethanol amine, triethanolamine (TEOA), alkanolamine Vantex™ T, or blends, mixtures or combinations thereof. One of ordinary skill in the art will be familiar with the foregoing examples of low-volatility bases and appreciate certain low-volatility bases may contain added water, such as 2-amino-2-methyl-1-propanol containing 5% added water, 2-amino-2-methyl-1-propanol containing 25% added water, and the like. In some other aspects, the low volatility base has a vapor pressure under about 100 mm Hg at 20-25° C.

In certain aspects, the coating composition, when included in a paint, for example, may include one or more pigments, including pigments or fillers used to tone or opacify the paint. Suitable examples of pigments include, without limitation, titanium dioxide white, carbon black, lamp black, black iron oxide, red iron oxide, yellow iron oxide, brown iron oxide (a blend of yellow and red oxide with black oxide), phthalocyanine green, phthalocyanine blue, organic reds (such as naphthol red, quinacridone red and toluidine red), quinacridone magenta, quinacridone violent, DNA orange, and/or organic yellows (such as Hansa yellow), for example.

In certain aspects, the pigment volume concentration of the coating composition or paint formulations for high gloss finishes are between about 10 and about 25, preferably between about 12 and about 25, and more preferably between about 15 and about 20. In certain aspects, the pigment volume concentration of the coating composition or paint formulations for semi-gloss finishes are between about 20 and about 40, preferably between about 25 and about 35. In some aspects, the coating composition or paint formulations have greater than 0 lbs up to about 250 lbs of $TiO_2$ per 100 gal (U.S. gallons) of paint formulation. In some aspects, other colorants may be added to the paint formulation at point-of-sale. For example, between about 2 fluid ounces and about 16 fluid ounces may be added to a gallon (U.S. gallon) of paint formulation to make the desired colored paint.

Various methods can be used to prepare the polymer system described herein, including by conventional methods known to those of skill in the art. By controlling the type and amount of monomers selected, for example by controlling the acid content and molecular weight of the monomers selected, a polymer system suitable for low VOC coating compositions or paints may be formed. The resulting polymer system preferably provides excellent performance characteristics, such as, for example, scrub resistance, washability, stain resistance or block resistance, especially when the system is used in a semigloss or high gloss finish paint. The polymer system may also be used to provide a flat finish paint where scrub resistance may not be as important as in a semigloss or high gloss finish paint, but where excellent washability, stain resistance or block resistance may be desired.

In certain embodiments, the polymer system described herein may be prepared in a one-pot synthesis, wherein one or more monomers are sequentially fed into a single reaction vessel to obtain a polymer system with the desired characteristics. In other embodiments, a polymer blend is prepared by mixing one or more polymers together to obtain a polymer system as described herein. In other embodiments, the alkali-soluble resin is dissolved in a base solution before being blended with the base latex polymer system.

In certain aspects, the present invention includes a method of making a coating composition or paint composition. The method includes the steps of providing one or more latex polymers and blending the one or more latex polymers with at least about 2.5 wt. % of an alkali-soluble resin based upon the total resin solid content of the polymer system, preferably at least about 3 wt. %, and in other instances preferably at least about 4.5 wt. %. In certain aspects, the alkali-soluble resin is provided up to about 15 wt. %, preferably up to about 10 wt. %, and in other instances preferably up to about 7 wt. %. In some aspects, the alkali-soluble resin has an average molecular weight (Mw) between about 1,500 to about 20,000, between about 1,700 to about 17,500, or between about 5,000 to about 15,000. In some aspects, the alkali-soluble resin has an acid value of between about 100 to about 250, between about 125 to about 240, or between about 140 to about 220 units (mg KOH/g resin). In some aspects, the polymer system comprising the one or more latex polymers and the alkali-soluble resin is neutralized with a low-volatility base.

In an embodiment, the coating composition or paints made with the polymer system described herein demonstrate excellent washability without negatively impacting stain resistance, scrub resistance, or block resistance. In certain aspects, the coating composition or paints described herein show a washability rating of at least 6, more preferably at least 7, more preferably at least 8, and most preferably at least 9.

In an embodiment, the coating composition or paints made with the polymer system described herein demonstrate excellent scrub resistance without negatively impacting stain resistance, washability, or block resistance. In certain aspects, the coating composition or paints described herein have a scrub resistance of at least about 300 scrub cycles, at least about 350 scrub cycles, at least about 400 scrub cycles, at least about 500 scrub cycles, at least about 600 scrub cycles, at least about 700 scrub cycles, at least about 800 scrub cycles, at least about 900 scrub cycles, at least about 1000 scrub cycles, at least about 1100 scrub cycles, at least about 1200 scrub cycles, at least about 1300 scrub cycles, at least about 1400 scrub cycles, or at least about 1500 scrub cycles The composition described herein may include other components or additives, added to either the reaction mixture of monomers used to make the composition, to the polymer system, or to a paint composition that includes the polymer system described herein. Methods of making paints will be familiar to those of skill in the art. Suitable additives used in paint compositions are known to those of skill in the art and include, without limitation, coalescent agents, surfactants, open time agents, pH adjustors, initiator and chaser solutions, cross-linking agents, preservatives, defoaming agents, anticorrosive agents, fillers, thixotropes, rheological modifiers, matting agents, and combinations thereof. The additives may include one or more ingredients added to a paint to modify the properties or enhance paint performance during storage, handling, application and other or subsequent stages. Desirable performance characteristics of a paint include, for example, chemical resistance, abrasion or scrub resistance, tack resistance, hardness, gloss, reflectivity, appearance and/or a combination of such properties and similar other properties. Preferred performance enhancing additives include lacquers, waxes, flatting agents, additives to prevent mar, abrasion and the like.

In certain aspects, the coating composition described herein may include a coalescent that aids in film formation. Preferred coalescents have VOC content of less than about 50 wt. %, preferably less than about 30 wt. %, more preferably, less than about 20 wt. %, and most preferably, less than about 15 wt. % based upon coalescent weight. In certain aspects, preferred coalescents have VOC content of less than 100 g/L, less than 75 g/L, less than 50 g/L, less than 25 g/L, less than 15 g/L, less than 10 g/L, and in some aspects less than 5 g/L. Exemplary suitable coalescents include benzoates such as alkyl benzoates, monobenzoates and dibenzoates, dioctyl maleate, oleic acid propylene glycol esters, and other low VOC compounds of the type described in U.S. Pat. Nos. 6,762,230 B2, 7,812,079 B2 and 8,110,624 B2 (collectively, Brandenburger et al.), in U.S. Pat. No. 8,106,239 B2 (Zhou et al.), and in U.S. Published Patent Application Nos. US 2010/0178494 A1 (Foster et al.) and US 2009/0149591 A1 (Yang et al.); mixtures thereof and the like. Other suitable low VOC coalescents include EPS™ 9147 (Engineered Polymer Solutions & Color Corporation of America), hexanoates such as Optifilm™ 400 (Eastman Chemical, Kingsport TN), Velate™ 368 (Eastman Chemical, Kingsport TN), Loxanol™ (Cognis, Kankakee IL, now BASF), Archer RC™ (ADM, Decator IL), and the like. Conventional coalescents such as, Texanol™ (Eastman Chemical) and the like can also be used, either alone or in combination with other solvents such as, for example, 2-butoxyethanol (butyl cellosolve), diethylene glycol monobutyl ether (butyl carbitol), and the like, provided acceptable VOC levels are not exceeded in the coating composition or paint. When a coalescent is present, the coating compositions preferably contain about 0.05 to about 10 or about 0.05 to about 5 weight percent coalescent based on the final coating composition weight.

Exemplary dispersing agents include anionic polyelectrolyte dispersants such as maleic acid copolymers, acrylic acid copolymers including methacrylic acid copolymers, and carboxylic acids such as tartaric acid, succinic acid, citric acid, itaconic acid, mixtures thereof and other materials that will be familiar to persons having ordinary skill in the art.

Exemplary defoamers include silicones, ethylene oxide propylene oxide copolymers, oils and waxes such as FOAMSTAR™ A-32, FOAMSTAR A-34, FOAMSTAR A-36, FOAMSTAR A-38, FOAMSTAR A-39, FOAMASTER™ 111, FOAMASTER 333 and FOAMASTER SA-3 from Cognis, TEGO™ FOAMEX™ 810 from Evonik, mixtures thereof and other materials that will be familiar to persons having ordinary skill in the art, including products from other suppliers such as Air Products and Chemicals, Ashland, BASF, BYK-Gardner USA, Cytec, Rhone Poulenc and Troy Corporation.

Exemplary surfactants or dispersants include anionic, amphoteric and nonionic materials. Commercially-available surfactants or dispersants include the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, Inc. and others, various members of the SURFYNOL™ series from Air Products and Chemicals, Inc. (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E. I. DuPont de Nemours and Co. and other suppliers, and phosphate esters from Ashland, Rhodia and other suppliers. When a surfactant or dispersant is present, the coating compositions preferably contain about 0.1 to about 10 weight percent and more preferably about 1 to about 3 weight percent surfactant or dispersant based on the total composition weight.

The disclosed coating compositions may contain a variety of other adjuvants that will be familiar to persons having ordinary skill in the art. Representative adjuvants are described in Koleske et al., Paint and Coatings Industry, April, 2003, pages 12-86. Exemplary adjuvants and commercial examples of the same include anti-cratering agents; biocides, fungicides, mildewcides and preservatives (e.g., BUSAN™ 1292 from Buckman Laboratories, Inc., NOPCOCIDE™ N-40D from Cognis, KATHON™ LX from Rohm & Haas, and POLYPHASE™ 663, POLYPHASE 678 and POLYPHASE PW-40 from Troy 5 Corporation); curing indicators; heat stabilizers; leveling agents; light stabilizers (e.g., hindered amine light stabilizers such as TINUVIN™ 123-DW and TINUVIN 292 HP from Ciba Specialty Chemicals); optical brighteners; ultraviolet light absorbers (e.g., TINUVIN 234 and TINUVIN 1130 from Ciba Specialty Chemicals); wetting agents (e.g., BYK™ 346 and BYK 348 from Altana, PENTEX™ 99 from Rhodia and TROYSOL LAC™ from Troy 10 corporation); waxes (e.g., AQUACER™ 593 from Altana, HYDROCER™ 303 from Shamrock Technologies, Inc. and MICHEM™ Emulsion 32535 from Michelman, Inc.); and the like. The types and amounts of these and other adjuvants typically will be empirically selected.

The disclosed coating compositions may be packaged in any convenient packaging suitable for storing a desired quantity of the coating composition during storage. Exemplary packaging containers include cans, pails, bottles, drums, totes and tanks. The disclosed compositions may be factory-applied to substrates such as building components at a manufacturing site, or may be supplied to end users and applied onsite to finished articles, e.g., as paints for use on architectural surfaces.

In certain aspects, the coating compositions of the present invention can be used as a paint formulation, including a base paint to be colored or tinted at the point-of-sale of a paint of desired color and finish. In an aspect, the base paint may be clear (unpigmented) or pigmented prior to being colored or tinted. In certain aspects, the base paint contains about 30 wt. % to about 60 wt. % water, which may be tap, deionized, distilled, reverse osmosis or recycled water.

In certain aspects, the base paint is tinted or colored in-store using one or more commercially available colorants. Suitable colorants which can be used in a coating composition or paint formulation include, for example, NovoColor (Color Corp. of America, Louisville, Ky.) colorants, e.g. zero-VOC colorants compatible with water-based coating compositions as described herein. Preferred colorant compositions include a colorant component, e.g. a pigment dispersed in a liquid phase, a surfactant package that includes a latex-compatible surfactant, a carrier, and other optional additives. Exemplary colorant compositions include single colorant formulations compatible with latex paints, of the kind described in U.S. Pat. Nos. 6,488,760 and 7,659,340. These colorant compositions are uniform and do not require mixing before addition to a base paint formulation, have extended shelf-life, and show viscosity increase of less than about 15 KU, more preferably less than about 10 KU, when stored over an extended period of time at temperatures of about 40° to 50°.

In an aspect, the coating composition can be used in a base paint formulation to be tinted to produce a dark or deeply colored paint. To produce such dark or deeply colored paint requires a high colorant load. In an aspect, the amount of colorant to be added to the base paint is determined by the desired color and finish (e.g. glossy, semi-gloss, satin, etc.) of the colored paint. Preferably, the paint includes up to about 20 wt % colorant, more preferably about 5 to 15 wt % colorant, and most preferably about 8 to 12 wt % colorant.

In certain aspects, the coating composition comprises an in-store tintable liquid base paint formulation in a container having headspace sufficient to receive a quantity of one or more low VOC colorants, wherein the colorant has less than about 20 g/L VOC, less than about 15 g/L VOC, less than about 10 g/L VOC.

The invention is illustrated by the following examples. The disclosed examples, materials, amounts, and procedures are merely exemplary. Unless otherwise indicated, all parts and percentages are by weight and all molecular weights are weight average molecular weight. Unless otherwise specified, all chemicals used are commercially available from, for example, Sigma-Aldrich, St. Louis, Missouri or other commercial suppliers.

EXAMPLES

Unless indicated otherwise, the following test methods were utilized in the Examples that follow.

Washability

The washability of paint formulation were tested using ASTM D3450-00 (Standard Test Method for Washability Properties of Interior Architectural Coatings), which was modified to run 100 continuous cycles instead of stopping the apparatus every 25 cycles to clean the sponge in running water. Paint was applied to a black mylar chart with a 7-mil Dow bar. After 1 week dry time under ambient lab conditions (20-25° C. with an average of 23° C.), various stains (Lipstick—Covergirl #305 Hot Chaleur; Mustard—Heinz Yellow Mustard; and Coffee made with Folgers Classic Roast Medium Ground Coffee) were applied. The mustard and lipstick were applied directly to the panel until the testing area was covered completely with the stain. Coffee was applied to a rectangular strip of napkin that was placed on the panel until the napkin was saturated with coffee. After two hours, excess stain was removed with a paper towel. The stained panels were then put on a scrub machine (Gardco Model D10) and washed with a sponge containing a non-abrasive soap solution (SC-1 Leneta-ASTM Scrub Media) and water for 100 cycles. The panels were then rinsed with water and left to dry before the total color difference ($\Delta E$) values were obtained. $\Delta E$ values were calculated by measuring the lightness (L), difference in red and green (a), and difference in yellow and blue (b) values of an unstained/unwashed portion and a stained/washed portion of the sample using a spectrophotometer (Datacolor Check II Plus). The total color difference is then calculated using the following formula: $\Delta E=(\Delta L^2+\Delta a^2+\Delta b^2)^{0.5}$.

The $\Delta E$ values for each example formulation were compared to the values obtained from the control formulation. The $\Delta E$ values of the control were then subtracted from the $\Delta E$ values for each Example to obtain $\Delta\Delta E$ values. Thus, a negative $\Delta\Delta E$ value indicates a less severe stain compared to the respective control.

High-Temperature Block Resistance

The high-temperature block resistance testing of the paint formulation were tested using ASTM D4946 (Standard Test Method for Blocking Resistance of Architectural Patents). The applied paint formulation testing was conducted after 24 hour cure time, in a 50° C. oven for 30 minutes under a 1 kg weight.

Scrub Resistance

The scrub resistance of the paint formulations were tested using ASTM D2486-96 (Standard Test Method for Scrub Resistance of Wall Paints), by applying the paint formulation to a black mylar substrate at a wet coating thickness of 7 mil using a Dow bar and allowing the coating to cure for 1 week at ambient temperature.

Example 1—High-Gloss Paint Formulations

For each of the paint formulations of Examples 1-21 in Table 1 below, a 100-gallon formulation of white high-gloss paint was prepared using the listed ingredients (lbs.), with the pigment provided in liquid form. In Examples 1-19 that include an alkali-soluble resin, the alkali-soluble resin is INDUREZ™ SR 10 PG having about a 30% acid percent, an acid value of 215-230 mg KOH/g and an Mw of 9,000-10,500 g/mol. In these examples, the alkali-soluble resin was supplied in pellet form and dissolved in water and ammonia, creating a 28 wt. % solid solution, before being blended with the base latex polymer (48 wt. % solids) to form the paint formulation. Example 1 contains ammonia but does not contain an alkali-soluble resin and was used as a control for washability and high-temperature block testing. Examples 4 and 7-9 also do not use an alkali-soluble resin but do contain AMP or KOH as a base, such that these examples are used for an analysis of the washability and high-temperature block testing compared to the examples using both an alkali-soluble resin and a base.

For comparative purposes to the paint formulations that include INDUREZ™ SR 10 PG as an alkali-soluble resin, Examples 20 and 21 include a comparative alkali-soluble resin having about 10% acid percent, an acid value of about 65 mg KOH/g and an Mw of about 19,000-30,000. Example 19 does not use an alkali-soluble resin, but is used as the control for comparative example below for washability testing of Examples 20 and 21.

TABLE 1

White High-Gloss Formulations (pounds of material per 100 gallon formulation).

| | Amount (lbs) | | | | | | | | |
|---|---|---|---|---|---|---|---|---|---|
| Raw Material | Ex. 1 | Ex. 2 | Ex. 3 | Ex. 4 | Ex. 5 | Ex. 6 | Ex. 7 | Ex. 8 | Ex. 9 |
| Base Latex Polymer | 572.0 | 557.7 | 543.4 | 572.0 | 557.7 | 543.4 | 572.0 | 572.0 | 572.0 |
| Indurez ™ SR 10 PG | 0 | 24.5 | 49.0 | 0 | 24.5 | 49.0 | 0 | 0 | 0 |
| Pigment | 250.0 | 250.0 | 250.0 | 250.0 | 250.0 | 250.0 | 250.0 | 250.0 | 250.0 |
| Dispersant | 5.0 | 5.0 | 5.0 | 5.0 | 5.0 | 5.0 | 5.0 | 5.0 | 5.0 |
| Surfactant | 2.0 | 2.0 | 2.0 | 2.0 | 2.0 | 2.0 | 2.0 | 2.0 | 2.0 |
| Defoamer | 1.0 | 1.0 | 1.0 | 1.0 | 1.0 | 1.0 | 1.0 | 1.0 | 1.0 |
| Biocide | 1.5 | 1.5 | 1.5 | 15 | 1.5 | 1.5 | 1.5 | 1.5 | 1.5 |
| Ammonia | 1.0 | 1.0 | 1.0 | 0 | 0 | 0 | 0 | 0 | 0 |
| AMP | 0 | 0 | 0 | 4.0 | 4.0 | 4.0 | 0 | 0 | 0 |
| KOH | 0 | 0 | 0 | 0 | 0 | 0 | 2.0 | 4.0 | 6.0 |

TABLE 1-continued

White High-Gloss Formulations (pounds of material per 100 gallon formulation).

| | | | | | | | | | |
|---|---|---|---|---|---|---|---|---|---|
| Coalescent | 28.8 | 26.1 | 24.7 | 28.8 | 26.1 | 23.3 | 28.8 | 28.8 | 28.8 |
| Defoamer | 1.0 | 1.0 | 1.0 | 1.0 | 1.0 | 1.0 | 1.0 | 1.0 | 1.0 |
| ICI Builder | 16.0 | 12.0 | 12.0 | 12.0 | 12.0 | 12.0 | 16.0 | 16.0 | 16.0 |
| KU Builder | 2.0 | 4.0 | 8.0 | 2.0 | 4.0 | 8.0 | 2.0 | 2.0 | 2.0 |
| Water | 161.7 | 156.2 | 143.4 | 162.7 | 153.2 | 141.8 | 160.7 | 158.7 | 156.7 |
| Total | 1042 | 1042 | 1042 | 1042 | 1042 | 1042 | 1042 | 1042 | 1042 |

| Raw Material | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Base Latex Polymer | 554.8 | 554.8 | 554.8 | 549.1 | 549.1 | 549.1 | 543.4 | 543.4 | 543.4 |
| Indurez ™ SR 10 PG | 29.4 | 29.4 | 29.4 | 39.2 | 39.2 | 39.2 | 49.0 | 49.0 | 49.0 |
| Pigment | 250.0 | 250.0 | 250.0 | 250.0 | 250.0 | 250.0 | 250.0 | 250.0 | 250.0 |
| Dispersant | 5.0 | 5.0 | 5.0 | 5.0 | 5.0 | 5.0 | 5.0 | 5.0 | 5.0 |
| Surfactant | 2.0 | 2.0 | 2.0 | 2.0 | 2.0 | 2.0 | 2.0 | 2.0 | 2.0 |
| Defoamer | 1.0 | 1.0 | 1.0 | 1.0 | 1.0 | 1.0 | 1.0 | 1.0 | 1.0 |
| Biocide | 1.5 | 1.5 | 1.5 | 1.5 | 1.5 | 1.5 | 1.5 | 1.5 | 1.5 |
| Ammonia | 0 | 0 | 0 | 0 | 0 | 0 | 0 | 0 | 0 |
| AMP | 0 | 0 | 0 | 0 | 0 | 0 | 0 | 0 | 0 |
| KOH | 2.0 | 4.0 | 6.0 | 2.0 | 4.0 | 6.0 | 2.0 | 4.0 | 6.0 |
| Coalescent | 28.8 | 28.8 | 28.8 | 27.4 | 27.4 | 27.4 | 27.4 | 27.4 | 27.4 |
| Defoamer | 1.0 | 1.0 | 1.0 | 1.0 | 1.0 | 1.0 | 1.0 | 1.0 | 1.0 |
| ICI Builder | 16.0 | 16.0 | 16.0 | 24.0 | 24.0 | 24.0 | 24.0 | 24.0 | 24.0 |
| KU Builder | 2.0 | 2.0 | 2.0 | 6.0 | 6.0 | 6.0 | 7.6 | 7.6 | 7.6 |
| Water | 139.9 | 137.9 | 135.9 | 135.1 | 133.1 | 131.1 | 129.4 | 127.4 | 125.4 |
| Total | 1042 | 1042 | 1042 | 1042 | 1042 | 1042 | 1042 | 1042 | 1042 |

| Raw Material | Ex. 19 | Ex. 20 | Ex. 21 |
|---|---|---|---|
| Base Latex Polymer | 572.0 | 543.9 | 515.3 |
| Comparative ASR | 0 | 45.8 | 91.6 |
| Pigment | 225.0 | 225.0 | 225.0 |
| Dispersant | 5.0 | 5.0 | 5.0 |
| Surfactant | 2.0 | 2.0 | 2.0 |
| Defoamer | 1.0 | 1.0 | 1.0 |
| Biocide | 1.5 | 1.5 | 1.5 |
| Ammonia | 1.0 | 1.0 | 1.0 |
| Coalescent | 24.7 | 24.7 | 24.7 |
| Defoamer | 1.0 | 1.0 | 1.0 |
| ICI Builder | 20.0 | 20.0 | 20.0 |
| KU Builder | 2.5 | 2.5 | 3.0 |
| Water | 186.3 | 168.6 | 150.9 |
| Total | 1042 | 1042 | 1042 |

Example 2-Washability and High-Temperature Block Resistance Testing

Washability and high-temperature block resistance test results of paint formulation Examples 1-21 are provided in Table 2. The ΔE values for each example formulation was compared to the values obtained from the control formulation that did not contain any ASR and a volatile base. For Example 1 (control), the ΔE values were 51 (Lipstick), 31 (Mustard) and 4.5 (Coffee) for a total ΔE value of 86.5. The ΔE values of Example 1 (control) were then subtracted from the ΔE values for each Example 2-18. For the comparative alkali-soluble resin, the ΔE values of comparison Example 19 (control) was subtracted from the ΔE values for each of comparative examples Example 20-21, to obtain the ΔΔE values in Table 2. Thus, a negative ΔΔE value in Table 2 indicates a less severe stain compared to the respective control.

TABLE 2

Washability and High-Temperature Block-Resistance Data.

| | Indurez ™ SR 10 PG (wt % s/s) | Ammonia (lbs) | AMP (lbs) | KOH (lbs) | Lipstick ΔΔE | Mustard ΔΔE | Coffee ΔΔE | Total ΔΔE | HT Block 24 hr | Scrubs |
|---|---|---|---|---|---|---|---|---|---|---|
| Ex. 1 | 0 | 1 | 0 | 0 | 0 | 0 | 0 | 0 | 9 | >1500 |
| Ex. 2 | 2.5 | 1 | 0 | 0 | −19.0 | −2.0 | −0.2 | −21.2 | 9 | — |
| Ex. 3 | 5 | 1 | 0 | 0 | −46.5 | −4.0 | −1.9 | −52.4 | 8 | 1150 |
| Ex. 4 | 0 | 0 | 4 | 0 | −15.0 | −3.0 | −0.3 | −18.3 | 0 | — |
| Ex. 5 | 2.5 | 0 | 4 | 0 | −22.0 | −3.0 | −1.6 | −23.4 | 4 | — |
| Ex. 6 | 5 | 0 | 4 | 0 | −52.5 | −10.0 | −0.7 | −63.2 | 0 | — |

TABLE 2-continued

Washability and High-Temperature Block-Resistance Data.

| | | | | | | | | | | |
|---|---|---|---|---|---|---|---|---|---|---|
| Ex. 7 | 0 | 0 | 0 | 2 | −2.7 | −3.9 | −2.0 | −8.6 | 9 | >1500 |
| Ex. 8 | 0 | 0 | 0 | 4 | −10.9 | −3.0 | −0.7 | −14.6 | 5 | >1500 |
| Ex. 9 | 0 | 0 | 0 | 6 | −18.3 | −2.8 | 0.9 | −20.2 | 0 | >1500 |
| Ex. 10 | 3 | 0 | 0 | 2 | −11.2 | −2.8 | −1.7 | −15.7 | 8 | — |
| Ex. 11 | 3 | 0 | 0 | 4 | −25.5 | −3.6 | −1.6 | −30.7 | 8 | — |
| Ex. 12 | 3 | 0 | 0 | 6 | −29.3 | −4.5 | −2.2 | −36.0 | 7 | — |
| Ex. 13 | 4 | 0 | 0 | 2 | −27.3 | −6.9 | −2.6 | −36.8 | 8 | 1200 |
| Ex. 14 | 4 | 0 | 0 | 4 | −31.1 | −4.7 | −1.6 | −37.4 | 7 | 1400 |
| Ex. 15 | 4 | 0 | 0 | 6 | −52.8 | −9.7 | −2.5 | −65.0 | 7 | 1300 |
| Ex. 16 | 5 | 0 | 0 | 2 | −39.3 | −6.7 | −2.5 | −48.5 | 7 | 1150 |
| Ex. 17 | 5 | 0 | 0 | 4 | −52.3 | −10.3 | −4.0 | −66.6 | 7 | 1150 |
| Ex. 18 | 5 | 0 | 0 | 6 | −52.6 | −8.6 | −1.6 | −62.8 | 6 | 1050 |

| | Comp. ASR (wt % s/s) | Ammonia (lbs) | AMP (lbs) | KOH (lbs) | Lipstick ΔΔE | Mustard ΔΔE | Coffee ΔΔE | Total ΔΔE | HT Block 24 hr | Scrubs |
|---|---|---|---|---|---|---|---|---|---|---|
| Ex. 19 | 0 | 1 | 0 | 0 | 0 | 0 | 0 | 0 | — | — |
| Ex. 20 | 5 | 1 | 0 | 0 | −0.1 | 1.3 | 1.4 | 2.6 | — | — |
| Ex. 21 | 10 | 1 | 0 | 0 | −2.2 | 0.2 | 0.2 | −1.8 | — | — |

As shown in Table 2, Examples 1-18 demonstrate an improved washability and block resistance of the coating composition containing an alkali-soluble resin in the presence of a low-volatility base (e.g., KOH), with Examples 10-18 having various amounts of both the alkali-soluble resin and the low-volatility base. This data illustrates that the washability value of the coating composition increases with the greater addition of the alkali-soluble resin from 0 wt. % up to 5 wt. % without severely impacting the scrub resistance or block resistance. Examples 7-9 also demonstrate that the addition of the low-volatility base without also adding the alkali-soluble resin impacts the block resistance negatively upon the increasing amount of the low-volatility base, to a 5 rating (Example 8) and 0 rating (Example 9). However, when incorporating both the low-volatility base and the alkali-soluble resin in the coating composition of the paint (Examples 15 and 18), the block resistance is a 7 and 6 rating, respectively. And in Examples 15 and 18 the washability of the paints was also improved.

Comparative Examples 19-21 in Table 2 illustrate that washability is not improved at high levels of the comparative alkali-soluble resin (washability of comparative Examples 20 and 21 being compared to comparative Example 19, which is the base paint without the alkali-soluble resin).

Example 3-High-Gloss White Formulations

For each of the paint formulations of Examples 22-30 in Table 3 below, a 100-gallon formulation of white high-gloss paint was prepared using the listed ingredients (lbs.), with the pigment provided as a TiO2 slurry. In Examples 23-30 that include an alkali-soluble resin, the Mw of the alkali-soluble resin was between about 1700 and about 17,250 g/mol with an acid value between about 140 and about 240, as provided by the alkali-soluble resin data in Table 3. In Examples 23-30, the alkali-soluble resin was supplied in pellet form and dissolved in water and ammonia, before being blended with the base latex polymer to form the paint formulation. The percent weight (solids/solids) of the alkali-soluble resin to the total polymer system (solids amount of the base latex polymer and the solids amount of the alkali-soluble resin) for each paint formulation was 5.5% of each alkali-soluble resin in Table 3. Example 22 does not contain an alkali-soluble resin and is used as a control for scrub resistance, washability and high-temperature block testing below for Examples 23-30.

TABLE 3

White High-Gloss Formulations (pounds of material per 100 gallon formulation).

| Raw Material | Amount (lbs) | | | | | | | | |
|---|---|---|---|---|---|---|---|---|---|
| | Ex. 22 | Ex. 23 | Ex. 24 | Ex. 25 | Ex. 26 | Ex. 27 | Ex. 28 | Ex. 29 | Ex. 30 |
| Base Latex Polymer | 572.0 | 541.0 | 541.0 | 541.0 | 541.0 | 541.0 | 541.0 | 541.0 | 541.0 |
| Water | 79.1 | 79.8 | 65.6 | 60.5 | 65.9 | 55.1 | 71.3 | 68.4 | 59.7 |
| ASR | 0.0 | 30.2 | 44.5 | 49.6 | 44.2 | 55.0 | 38.8 | 41.6 | 50.4 |
| TiO2 Slurry | 326.8 | 326.8 | 326.8 | 326.8 | 326.8 | 326.8 | 326.8 | 326.8 | 326.8 |
| Dispersant | 8.0 | 8.0 | 8.0 | 8.0 | 8.0 | 8.0 | 8.0 | 8.0 | 8.0 |
| Surfactant | 1.2 | 1.2 | 1.2 | 1.2 | 1.2 | 1.2 | 1.2 | 1.2 | 1.2 |
| Biocide | 1.5 | 1.5 | 1.5 | 1.5 | 1.5 | 1.5 | 1.5 | 1.5 | 1.5 |
| Neutralizing Amine | 1.0 | 1.0 | 1.0 | 1.0 | 1.0 | 1.0 | 1.0 | 1.0 | 1.0 |

TABLE 3-continued

White High-Gloss Formulations (pounds of material per 100 gallon formulation).

| Raw Material | Amount (lbs) | | | | | | | | |
|---|---|---|---|---|---|---|---|---|---|
| | Ex. 22 | Ex. 23 | Ex. 24 | Ex. 25 | Ex. 26 | Ex. 27 | Ex. 28 | Ex. 29 | Ex. 30 |
| Coalescent | 27.4 | 27.4 | 27.4 | 27.4 | 27.4 | 27.4 | 27.4 | 27.4 | 27.4 |
| Defoamer | 1.0 | 1.0 | 1.0 | 1.0 | 1.0 | 1.0 | 1.0 | 1.0 | 1.0 |
| ICI Thickener | 14.0 | 14.0 | 14.0 | 14.0 | 14.0 | 14.0 | 14.0 | 14.0 | 14.0 |
| KU Thickener | 3.56 | 4.4 | 4.0 | 4.0 | 4.4 | 3.6 | 3.6 | 4.0 | 3.6 |
| Total | 1035.6 | 1036.4 | 1036.0 | 1036.0 | 1036.4 | 1035.6 | 1035.6 | 1036.0 | 1035.6 |
| ASR Data: | | | | | | | | | |
| MW (mol/g) | — | 1700 | 8500 | 13000 | 5800 | 17250 | 9200 | 11500 | 7000 |
| Acid Value | — | 238 | 215 | 213 | 220 | 214 | 220 | 141 | 220 |

Example 4—Washability, High-Temperature Block and Scrub Resistance Testing

The washability, high-temperature block resistance, and scrub resistance testing of paint formulation Examples 23-30 are provided in Tables 4 and 5.

TABLE 4

High-Temperature Block Resistance and Scrub Resistance Data

| | 1 d HT Block | Scrub Cycles (Average) |
|---|---|---|
| Ex. 23 | 5 | 1331 |
| Ex. 24 | 5 | 1000 |
| Ex. 25 | 5 | 1000 |
| Ex. 26 | 5 | 863 |
| Ex. 27 | 6 | 633 |
| Ex. 28 | 5 | 1244 |
| Ex. 29 | 5 | 1261 |
| Ex. 30 | 5 | 1387 |

For washability, the ΔE values for each example formulation of Examples 23-30 were compared to the values obtained formulation Example 22 (control) that did not contain any ASR. The ΔE values of Example 22 was then subtracted from the ΔE values for each Examples 23-30. Thus, a negative ΔΔE value in Table 5 indicates a less severe stain compared to the control.

TABLE 5

Washability Data.

| | Lipstick ΔE | Mustard ΔE | Coffee ΔE | Average ΔE | Average ΔE all Stains | Lipstick ΔΔE | Mustard ΔΔE | Coffee ΔΔE |
|---|---|---|---|---|---|---|---|---|
| Ex. 22 | 2.78 | 27.02 | 6.36 | 12.05 | — | 0.0 | 0.0 | 0.0 |
| Ex. 23 | 0.96 | 21.29 | 3.63 | 8.6 | 4.0 | −1.82 | −5.73 | −2.73 |
| Ex. 24 | 0.16 | 22.76 | 3.52 | 8.8 | 3.8 | −2.62 | −4.26 | −2.84 |
| Ex. 25 | 0.18 | 16.55 | 1.81 | 6.2 | 2.7 | −2.6 | −10.47 | −4.55 |
| Ex. 26 | 0.49 | 22.04 | 2.66 | 8.4 | 4.0 | −2.29 | −4.98 | −3.7 |
| Ex. 27 | 0.7 | 22.29 | 3.75 | 8.9 | 4.1 | −2.08 | −4.73 | −2.61 |
| Ex. 28 | 0.46 | 22.42 | 4.89 | 9.3 | 4.3 | −2.32 | −4.6 | −1.47 |
| Ex. 29 | 2.14 | 24.42 | 7.19 | 11.3 | 5.0 | −0.64 | −2.6 | 0.83 |
| Ex. 30 | 0.24 | 19.78 | 3.86 | 8.0 | 4.0 | −2.54 | −7.24 | −2.5 |

As shown in Tables 4 and 5, Examples 23-30 demonstrate an improved washability of the coating composition containing the alkali-soluble resin. The data also illustrates that such formulations maintained a block resistance of at least 5, and in some instances 6 while maintaining an acceptable scrub resistance. The data of Examples 23-30 illustrate that the coating composition had a scrub resistance of at least 600 scrub cycles (Example 27), in some instances at least 800 scrub cycles (Example 26), in some instances at least 1000 scrub cycles (Examples 24 and 25), in some instances at least 1200 scrub cycles (Examples 28 and 29), and in some other instances at least 1300 scrub cycles (Examples 23 and 30).

As shown in Table 5, the high-gloss formulations of Examples 23-30 comprise a polymer system with a different alkali-soluble resin having about a 30% acid percent, an acid value of 215-230 mg KOH/g and an Mw of 9,000-10,500 g/mol. Each of these high-gloss formulations of Examples 23-30 had performance comparable to that of high-gloss formulation Examples 16-18.

As shown in Table 5, in some aspects, the high-gloss formulations having a slurry $TiO_2$ pigment have a ΔE value for Lipstick (Covergirl #305 Hot Chaleur) of less than 3, in some aspects less than 2, and in some other aspects less than 1. In some aspects, the high-gloss formulations having a slurry pigment have a ΔE value for Mustard (Heinz Yellow Mustard) of less than 30, in some aspects less than 25, in some aspects less than 24, in some aspects less than 23, in some aspects less than 22, in some aspects less than 21, and in some other aspects less than 20. In some aspects, the high-gloss formulations having a slurry pigment have a ΔE value for Coffee (made with Folgers Classic Roast Medium Ground Coffee) of less than 7, in some aspects less than 6, in some aspects less than 5, and in some other aspects less than 4. In some aspects, the high-gloss formulations having a slurry pigment have an average ΔE value for Lipstick (Covergirl #305 Hot Chaleur), Mustard (Heinz Yellow Mustard), and Coffee (made with Folgers Classic Roast Medium Ground Coffee) of less than 12, in some aspects less than 11, in some aspects less than 10, and in some other aspects less than 9.

Example 5—Flat Paint Formulations

For each of the paint formulations of Examples 31-33 in Table 6 below, a 100-gallon formulation of white flat paint was prepared using the listed ingredients (lbs.), with the pigment provided as a TiO2 slurry. In Examples 32 and 33 that include an alkali-soluble resin, the alkali-soluble resin is INDUREZ™ SR 10 PG having about a 30% acid percent, an acid value of 215-230 mg KOH/g and an Mw of 9,000-10,500 g/mol. In these examples, the alkali-soluble resin was supplied in pellet form and dissolved in water and ammonia, before being blended with the base latex polymer to form the paint formulation. Example 31 does not contain an alkali-soluble resin and is used as a control for washability testing below for Examples 32 and 33.

TABLE 6

White Flat Formulations (pounds of material per 100 gallon formulation).

| Raw Material | Amount (lbs) | | |
| --- | --- | --- | --- |
| | Ex. 31 | Ex. 32 | Ex. 33 |
| Base Latex Polymer | 506 | 495.7 | 475.5 |
| ASR | 0 | 17.3 | 52 |
| TiO2 Slurry | 326.7 | 326.7 | 326.7 |
| Filler #1 | 115 | 115 | 115 |
| Filler #2 | 60 | 60 | 60 |
| Filler #3 | 3 | 3 | 3 |
| Dispersant | 0.5 | 0.5 | 0.5 |
| Neutralizing Amine | 1 | 1 | 1 |
| Dispersant | 8 | 8 | 8 |
| Surfactant | 2 | 2 | 2 |
| Defoamer | 3 | 3 | 3 |
| Biocide | 3 | 3 | 3 |
| Fungicide | 10 | 10 | 10 |
| Coalescent | 24.3 | 24.3 | 24.3 |
| ICI Builder #1 | 10 | 10 | 10 |
| ICI Builder #2 | 10 | 10 | 10 |
| KU Builder | 1 | 2 | 4 |
| Water | 83.3 | 83.3 | 83.3 |
| Total | 1166.8 | 1174.8 | 1191.3 |

Example 6—Washability Testing

The washability results for paint formulation Examples 31-33 are provided in Table 7. The $\Delta E$ values for each formulation of Examples 32 and 33 were compared to the values obtained from the control formulation Example 31 that did not contain any ASR. The $\Delta E$ values of Example 31 was then subtracted from the $\Delta E$ values for each Examples 32 and 33. Thus, a negative $\Delta \Delta E$ value in Table 7 indicates a less severe stain compared to the respective control.

TABLE 7

Washability Data.

| | Lipstick $\Delta E$ | Mustard $\Delta E$ | Coffee $\Delta E$ | Total $\Delta E$ | Average $\Delta E$ | Lipstick $\Delta \Delta E$ | Mustard $\Delta \Delta E$ | Coffee $\Delta \Delta E$ |
| --- | --- | --- | --- | --- | --- | --- | --- | --- |
| Ex. 31 | 22.19 | 9.79 | 5.4 | 37.38 | 12.46 | 0.0 | 0.0 | 0.0 |
| Ex. 32 | 22.06 | 8.09 | 4.72 | 34.87 | 11.62 | −0.13 | −1.7 | −0.68 |
| Ex. 33 | 7.37 | 6.15 | 2.84 | 16.36 | 5.45 | −14.82 | −3.64 | −2.56 |

As shown in Table 7, the flat formulations using an alkali-soluble resin having about a 30% acid percent, an acid value of 215-230 mg KOH/g and an average molecular weight of 9,000-10,500 g/mol, had similar results as high-gloss formulations. In particular, washability of the flat paint formulation Examples 32 and 33 improved with an increased amount of the alkali-soluble resin in the polymer system. For instance, Example 32 (2 wt. % of the alkali-soluble resin in the polymer system (wt % s/s)) exhibited better washability for all three stains (Lipstick, Mustard and Coffee) than the control (no alkali-soluble resin). The washability of the paint formulation further improved in Example 33 (6.4 wt. % of the alkali-soluble resin in the polymer system (wt % s/s)) compared to Example 32.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant art will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A coating composition, comprising:
a polymer system comprising one or more latex polymers made from monomers comprising diacetone acrylamide; and at least one alkali-soluble resin; and
at least one pigment;
wherein the coating composition contains at least about 2.5 wt. % of the alkali-soluble resin based upon the total resin solid content of the coating composition, the alkali-soluble resin having a weight average molecular weight (Mw) of about 1,500 to about 20,000 and an acid number greater than about 100 mg KOH/g resin;
wherein a cured film of the coating composition has an improved washability compared to an analogous coating composition made without the alkali-soluble resin.

2. A coating composition according to claim 1, wherein the coating composition contains up to about 15 wt. % of the alkali-soluble polymer based on total resin solid content.

3. A coating composition according to claim 1, wherein the coating composition contains about 2.5 wt. % to about 7 wt. % of the alkali-soluble polymer based on total resin solid content.

4. A coating composition according to claim 1, wherein a cured film of the coating composition applied to a black mylar substrate using a 7-mil Dow bar at 1 week at ambient temperature has at least one of the following properties: a washability rating of at least 7; a scrub resistance of at least about 600 scrubs; and a blocking resistance of at least 6.

5. A coating composition according to claim 1, wherein the coating composition comprises a low-volatility base chosen from the group consisting of potassium hydroxide, sodium hydroxide, ammonia, 2-amino-2-methyl-1-propanol (AMP), diethyl amine (DEA), dimethylethanolamine (DMEA), triethylamine (TEA), monoethanol amine, diethanol amine, triethanolamine (TEOA), alkanolamine, and combinations thereof.

6. A coating composition according to claim 1, comprising up to about 0.5 wt % of a fluorosurfactant.

7. A coating composition according to claim 1, wherein the alkali-soluble resin comprises an organic solution polymerized polymer having an acid number of at least about 100 to about 250 mg KOH/g resin.

8. A coating composition according to claim 1, wherein the one or more latex polymers are made from monomers comprising 2-(acetoacetoxy)ethyl methacrylate.

9. A coating composition according to claim 1, wherein the coating composition comprises a coalescent.

10. A coating composition according to claim 9, wherein the coating composition comprises a coalescent having a VOC content of less than about 5 g/L.

11. A coating composition according to claim 1, wherein the coating composition has a pigment volume concentration between about 20 and about 40 or between about 10 and about 25.

12. A coating composition, comprising:
a dispersion of one or more latex polymers made from monomers comprising diacetone acrylamide; and at least one alkali-soluble resin, wherein the dispersion contains at least about 2.5 wt. % of the alkali-soluble resin based upon the total resin solid content of the coating composition, and the alkali-soluble resin has a weight average molecular weight (Mw) of about 1,500 to about 20,000 and an acid number greater than about 100 mg KOH/g resin;
wherein a cured film of the coating composition has an improved washability compared to an analogous coating composition made without the alkali-soluble resin.

13. A coating composition according to claim 12, wherein the coating composition comprises a low-volatility base having a vapor pressure under about 100 mm Hg at 25° C.

14. A coating composition according to claim 12, wherein the alkali-soluble resin has an acid number of at least about 125 to about 250 mg KOH/g resin.

15. A coating composition according to claim 12, wherein the coating composition comprises an in-store tintable liquid base paint formulation in a container having headspace sufficient to receive a quantity of one or more low VOC colorants, wherein the colorant has less than about 20 g/L VOC.

16. A coating composition according to claim 12, wherein the coating composition comprises an architectural paint.

17. A coating composition according to claim 12, wherein the coating composition comprises a total resin solids in an amount of about 20 to about 30 wt %.

18. A coating composition according to claim 12, wherein the coating composition has a viscosity in the range from about 80 to about 120 KU (Krebs Unit).

19. A coating composition comprising:
a polymer system comprising one or more latex polymers made from monomers comprising 2-(acetoacetoxy) ethyl methacrylate and diacetone acrylamide; and at least one alkali-soluble resin; and
at least one pigment;
wherein the coating composition contains at least about 2.5 wt. % of the alkali-soluble resin based upon the total resin solid content of the coating composition, the alkali-soluble resin having a weight average molecular weight (Mw) of about 1,500 to about 20,000 and an acid number greater than about 100 mg KOH/g resin.

20. A coating composition comprising:
a polymer system comprising one or more latex polymers made from monomers comprising diacetone acrylamide; and at least one alkali-soluble resin;
at least one pigment; and
a coalescent having a VOC content of less than about 5 g/L;
wherein the coating composition contains at least about 2.5 wt. % of the alkali-soluble resin based upon the total resin solid content of the coating composition, the alkali-soluble resin having a weight average molecular weight (Mw) of about 1,500 to about 20,000 and an acid number greater than about 100 mg KOH/g resin.

21. A coating composition comprising:
a polymer system comprising one or more latex polymers made from monomers comprising diacetone acrylamide; and at least one alkali-soluble resin; and
at least one pigment;
wherein the coating composition contains at least about 2.5 wt. % of the alkali-soluble resin based upon the total resin solid content of the coating composition, the alkali-soluble resin having a weight average molecular weight (Mw) of about 1,500 to about 20,000 and an acid number greater than about 100 mg KOH/g resin; and
wherein the coating composition has a pigment volume concentration between about 20 and about 40 or between about 10 and about 25.

* * * * *